(12) United States Patent  
Cotton et al.

(10) Patent No.: US 9,217,403 B1  
(45) Date of Patent: Dec. 22, 2015

(54) LEVEL SENSOR MOUNT

(71) Applicant: WALBRO ENGINE MANAGEMENT, L.L.C., Tucson, AZ (US)

(72) Inventors: Kenneth J. Cotton, Caro, MI (US); Kevin L. Israelson, Cass City, MI (US); Douglas W. Salowitz, Jr., Palms, MI (US); Roger N. Smith, Lapeer, MI (US); David L. Speirs, Cass City, MI (US)

(73) Assignee: Walbro Engine Management, L.L.C., Tucson, AZ (US)

( * ) Notice: Subject to any disclaimer, the term of this patent is extended or adjusted under 35 U.S.C. 154(b) by 177 days.

(21) Appl. No.: 13/911,187

(22) Filed: Jun. 6, 2013

Related U.S. Application Data

(60) Provisional application No. 61/660,032, filed on Jun. 15, 2012.

(51) Int. Cl.
| | |
|---|---|
| *F02M 37/08* | (2006.01) |
| *B60K 15/063* | (2006.01) |
| *F02M 37/10* | (2006.01) |
| *G01F 23/30* | (2006.01) |
| *F02M 37/00* | (2006.01) |
| *B60K 15/03* | (2006.01) |

(52) U.S. Cl.
CPC ......... *F02M 37/103* (2013.01); *F02M 37/0082* (2013.01); *G01F 23/30* (2013.01); *B60K 2015/03217* (2013.01); *Y10T 137/8342* (2015.04); *Y10T 137/85978* (2015.04); *Y10T 137/86027* (2015.04); *Y10T 137/86348* (2015.04)

(58) Field of Classification Search
CPC ............. F02M 37/103; F02M 37/0082; B60K 2015/03217; Y10T 137/86348; Y10T 37/8342; Y10T 137/85978; Y10T 137/86027
USPC ........ 137/565.01, 558, 565.16, 590; 123/509; 73/317
See application file for complete search history.

(56) References Cited

U.S. PATENT DOCUMENTS

| | | | | |
|---|---|---|---|---|
| 4,928,526 | A | * | 5/1990 | Weaver ............................ 73/313 |
| 5,375,467 | A | * | 12/1994 | Banse .......................... 73/290 R |
| 6,138,524 | A | * | 10/2000 | Tsuda et al. .................. 73/866.5 |
| 6,450,151 | B1 | * | 9/2002 | Frank et al. ..................... 123/514 |
| 6,761,193 | B1 | | 7/2004 | Cotton et al. |
| 6,966,305 | B2 | * | 11/2005 | Aubree et al. ................ 123/509 |
| 6,993,967 | B2 | * | 2/2006 | Forgue ......................... 73/290 V |
| 7,278,401 | B1 | * | 10/2007 | Cotton et al. ................. 123/457 |
| 2004/0060547 | A1 | * | 4/2004 | Aubree et al. ................ 123/497 |
| 2006/0042378 | A1 | * | 3/2006 | Tanaka et al. .................... 73/305 |

* cited by examiner

*Primary Examiner* — Atif Chaudry
(74) *Attorney, Agent, or Firm* — Reising Ethington P.C.

(57) ABSTRACT

A mount for a level sensor assembly in a fuel tank may include an interconnect member adapted to couple a first tube to a second tube to permit fuel flow through the first tube, the interconnect member and the second tube. The first tube is adapted to be in fluid communication with a fuel pump and the second tube is in fluid communication with fuel in the fuel tank. A bracket is coupled to the interconnect member and adapted to carry at least a portion of the level sensor assembly. In this way, the level sensor assembly may be coupled to fluid tubes associated with the fuel pump, or other tubes, as desired.

19 Claims, 3 Drawing Sheets

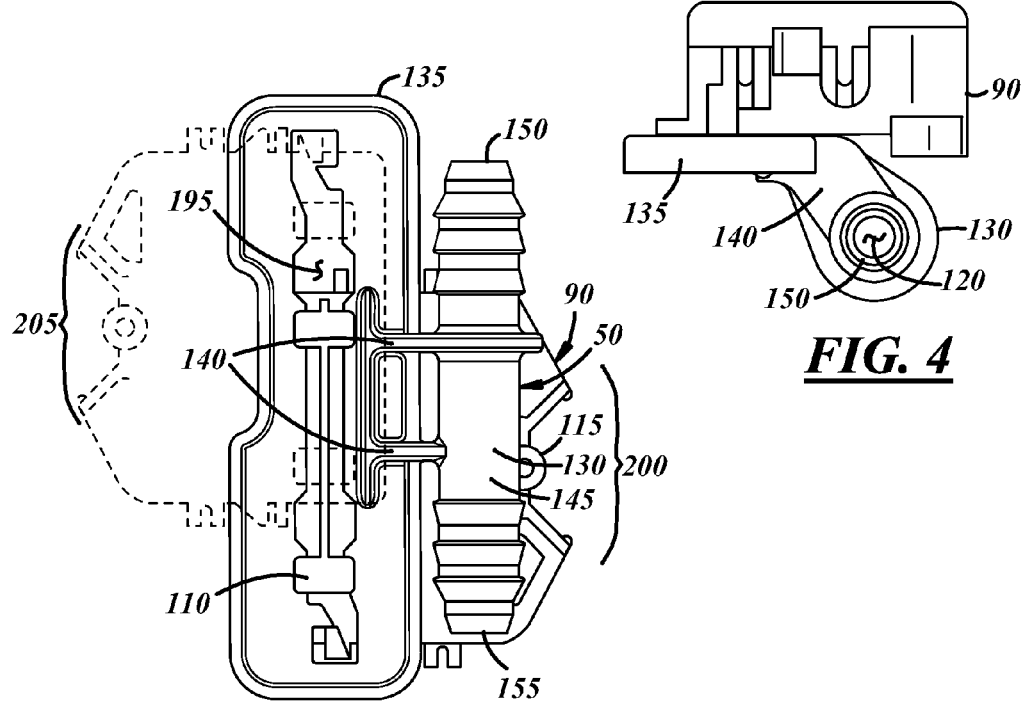
FIG. 2
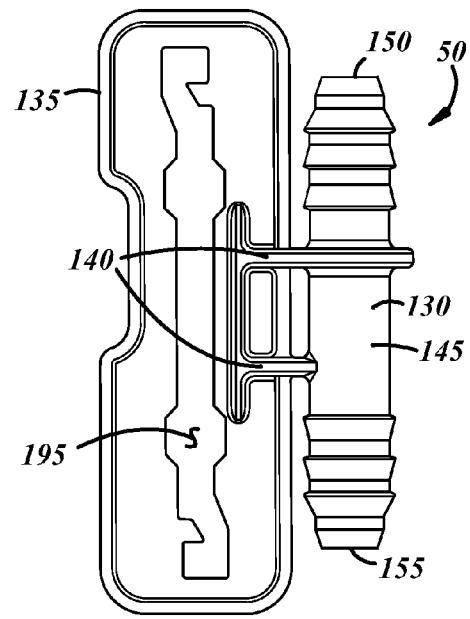
FIG. 4
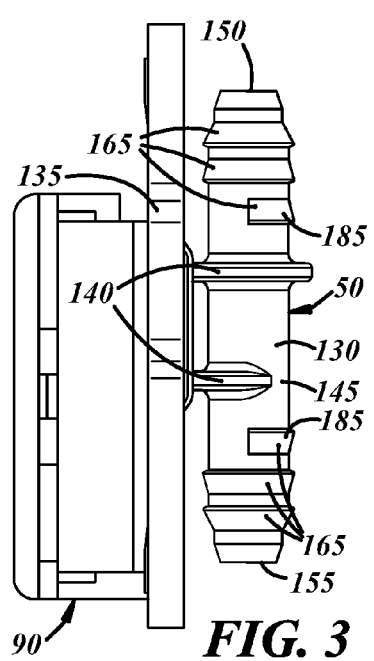
FIG. 3
FIG. 5

LEVEL SENSOR MOUNT

REFERENCE TO CO-PENDING APPLICATION

This application claims the benefit of U.S. Provisional Patent Application Ser. No. 61/660,032 filed on Jun. 15, 2012, which is incorporated herein by reference in its entirety.

TECHNICAL FIELD

The present disclosure relates generally to level sensor assemblies in fuel tanks, and more particularly to mounting the level sensor assemblies.

BACKGROUND

A typical fuel level sensor includes a float linked to the wiper of a variable resistor assembly to vary the resistance value of the resistor in accordance with the position of the float which tracks the level of fuel in a fuel tank. As the level of fuel within the fuel tank changes, the float moves and thereby varies the effective resistance of the variable resistor. In accordance with the change in resistance, an output signal changes and, thus, effects a change—such as from "Full" toward "Empty"—in a remote fuel level indicator. The accuracy of the fuel level indication may be affected by the placement of the fuel level sensor (e.g. the float) within the fuel tank. And changes to the position of the fuel level sensor can affect the signal provided from the level sensor.

SUMMARY

A mount for a level sensor assembly in a fuel tank may include an interconnect member adapted to couple a first tube to a second tube to permit fuel flow through the first tube, the interconnect member and the second tube. The first tube is adapted to be in fluid communication with a fuel pump and the second tube is in fluid communication with fuel in the fuel tank. A bracket is coupled to the interconnect member and adapted to carry at least a portion of the level sensor assembly. In this way, the level sensor assembly may be coupled to fluid tubes associated with the fuel pump, or other tubes, as desired.

An apparatus for a fuel tank may include a mount and a level sensor assembly carried by the mount. The mount may have an interconnect member adapted to couple a first tube to a second tube wherein fuel may be communicated through the first tube, second tube and the interconnect member. The first tube is adapted to be in fluid communication with a fuel pump and the second tube is adapted to communicate with fuel in the fuel tank so that fuel that flows from the tank to the fuel pump flows through the first and second tubes. The level sensor assembly is coupled to the mount so that coupling the mount to the tubes position the level sensor assembly relative to the tubes.

A fuel tank assembly may include a fuel pump assembly and a level sensor assembly. The fuel pump assembly may include a fuel pump for pumping fuel, a first tube through which fuel is provided to the fuel pump, and a mount coupled to the first tube. The level sensor assembly may be carried by the mount so that the level sensor assembly is carried by the first tube. In this way, the level sensor assembly may be easily and repeatably (over a production run) mounted relative to the fuel pump assembly and within the fuel tank.

A method of installing a level sensor assembly in a fuel tank, may include the steps of determining a desired orientation of the level sensor assembly in the fuel tank, coupling a mount for the level sensor assembly to a first tube according to the determination, and coupling the mount to a second tube whereby fluid flows through the first tube, the mount and the second tube. In this way, a level sensor assembly may be associated with one or more tubes within a fuel tank. And a desired location of the level sensor assembly may be accurately determined to facilitate more accurate fuel level indications from the level sensor assembly.

BRIEF DESCRIPTION OF THE DRAWINGS

The following detailed description of exemplary embodiments and best mode will be set forth with reference to the accompanying drawings, in which:

FIG. 2 is rear view of an embodiment of a mount and a housing of a level sensor assembly (LSA);

FIG. 3 is a right side view of the mount and LSA housing;

FIG. 4 is a top view of the mount and LSA housing;

FIG. 5 is a rear view of the mount shown in FIG. 1-4;

DETAILED DESCRIPTION OF PREFERRED EMBODIMENTS

Figure 1:
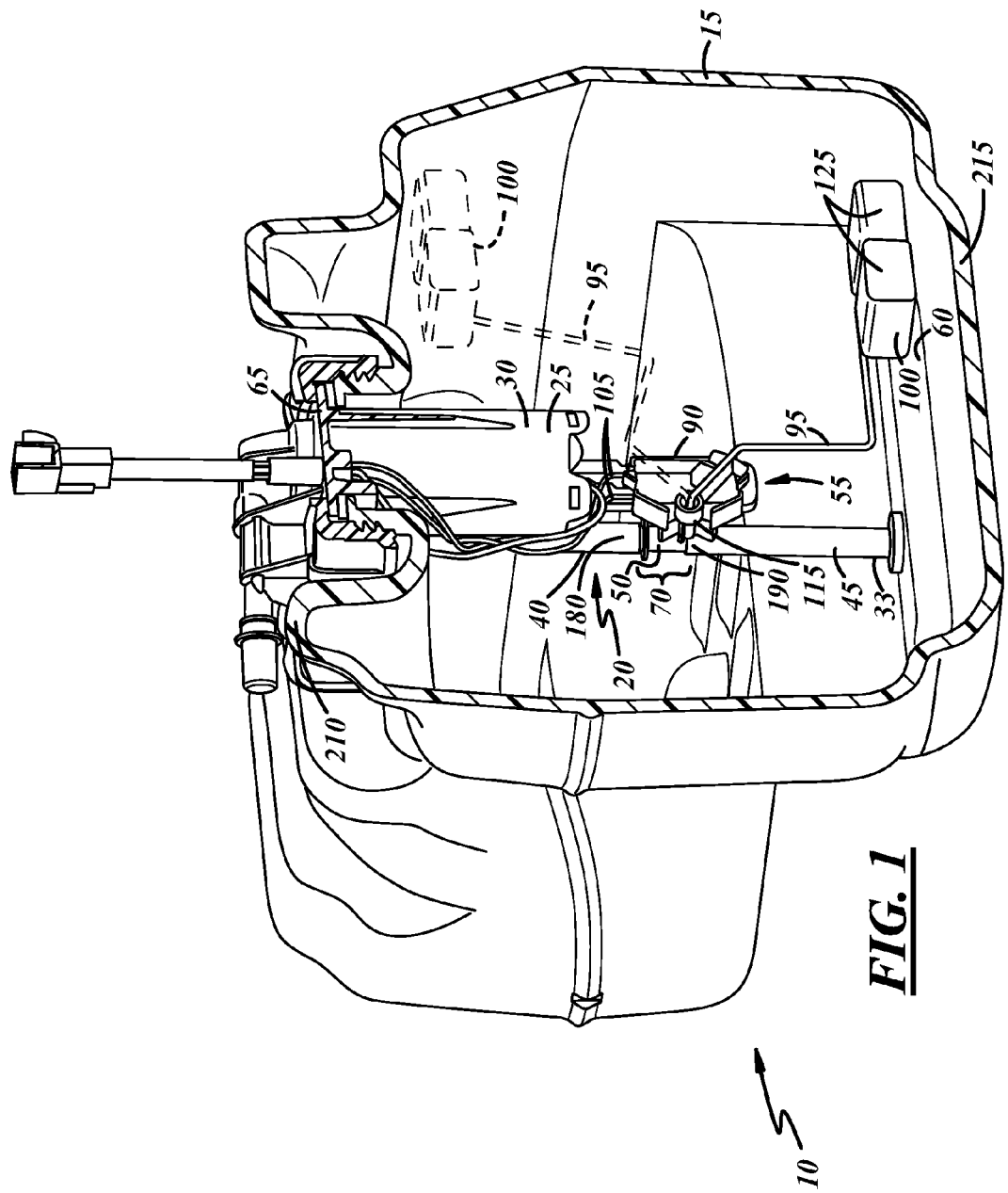
FIG. 1 is a perspective sectional view of a fuel tank assembly.
Figure 6:
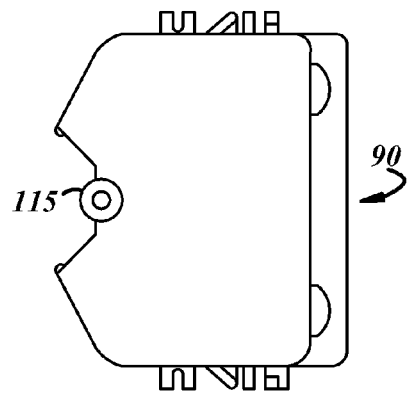
FIG. 6 is a front view of the housing of the LSA.

Referring in more detail to the drawings, FIG. 1 illustrates a fuel tank assembly 10 having a fuel tank 15 for holding fuel and a fuel pump assembly 20 for pumping fuel from the tank to an engine (not shown). The fuel pump assembly 20 includes a fuel pump 25 enclosed within and/or carried by a housing 30. The pump 20 may draw fuel through a filter 60 and one or more inlet tubes 40, 45. A fuel level sensor 55 may be coupled to one or more of the tubes between the pump 20 and the filter 60 to measure the amount of fuel in the tank. The level sensor and fuel tank assembly may be used in a vehicle such as passenger cars and other forms of motorized transportation or recreation including trucks, sports-utility vehicles (SUVs), recreational vehicles (RVs), construction and other heavy equipment or heavy-duty vehicles, tractors, all-terrain vehicles (ATVs), ride-on mowers, marine vessels, aircraft, snowmobiles, etc.

Figure 7:
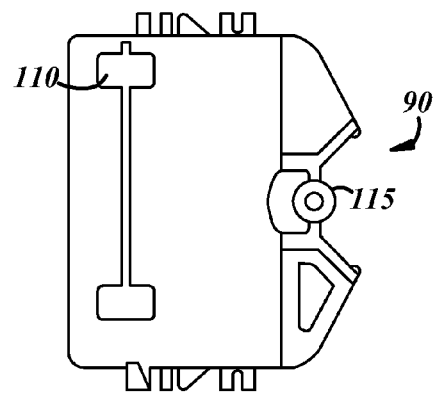
FIG. 7 is a rear view of the housing of the LSA.

Fuel level sensors are also known in the art; one such sensor is contemplated and described in U.S. Pat. No. 6,761,193 to Cotton et al., all of which is herein fully incorporated by reference. Referring to the implementation shown in FIG. 1, the fuel level sensor 55 may be a level sensor assembly (LSA) having a housing 90 (shown open, without a cover, and without electronics in FIG. 1), a float arm 95 with a float 100 coupled thereto, and an electrical interface 105. The housing 90 may have a male key 110 or appurtenance on one side (e.g., of an exterior surface) (FIG. 7). The housing 90 may have a joint 115 (FIGS. 1, 2, 6 and 7) for carrying the float arm 95, wherein the joint 115 permits the float arm 95 to rotate throughout a predetermined arc (e.g., throughout a range of angles relative to the orientation of the housing 90). The total range of rotation may vary depending on the fuel tank shape and the location of the LSA in the tank. As the level of fuel in the tank 15 changes, the position of the float changes which in turn changes the angle of the float arm as shown in FIG. 1 where the float and float arm are shown in solid lines when the tank is empty of fuel and shown in dashed lines when the tank is full (or nearly so). The LSA electronics provide a signal indicative of the level of fuel in the tank 15 based on the position or angle of the float arm at any given time.

The LSA 55 may be carried by a mount 50. In one embodiment, the mount 50 may have an interconnect member 130 to join an upper or first tube 40 to a lower or second tube 45, a bracket 135 to which the housing may be connected using the key 110, and one or more flanges 140 coupling the interconnect member 130 to the bracket 135 (FIGS. 2-5).

The interconnect member 130 may have a body portion 145, a first end 150 for coupling to the upper tube 40, and a second end 155 for coupling to the lower tube 45. The body portion 145 may be generally tubular in shape and have a passage 120 therethrough (i.e., longitudinally hollow) to permit, when the mount is installed, fuel to be drawn from the filter, through the body portion 145, and to the pump. One or more retention features, such as one or more barbs 165 may be provided near the first end 150. The barbs 165 may be raised ridges circumferential to and extending radially away from the body portion 145. To couple the mount and inlet tube together and provide a fluid tight seal between them, the first end 150 with its barb(s) 165 is adapted to be pressed within the interior 170 of an end 180 of one of the tubes (e.g., upper inlet tube 40). Also illustrated near the first end 150 is a partial barb 185 which extends only partially around the circumference of the body portion 145 (e.g., only half the circumference). One or more partial barbs 185 may be used to resist rotation between the mount 50 and the upper inlet tube 40. Among the barbs 165 at the first end 150, the partial barb 185 may be located farthest from the first end 150 (although this is not required). One or more retention features, such as barbs 165, may also be provided near the second end 155 of the interconnect member 130. As shown in FIGS. 2-3 and 5, the second end 155 may mirror the first end 150 (although this is not required). The second end 155 with its barbs 165 is adapted to be pressed within the interior 170 of an end 190 of one of the tubes (e.g., the lower inlet tube 45).

The bracket 135 of the mount may include any device or member for coupling the mount 50 to the housing 90 of LSA. In the illustrated embodiment, the bracket 135 is a plate-like member having a generally rectangular shape and a passage 195 which may be keyed as a female counterpart to the male key 110 of the housing 90. In the form shown, the passage 195 extends entirely through the bracket 135 having curves and/or angles which permit the male key 110 to enter the passage 195 and couple thereto. The illustrated passage 195 enables the bracket and the mount to be positively locked together. In addition, the illustrated passage 195 also may be used bi-directionally; i.e., the housing 90 may be coupled thereto in the shown orientation (a bottom position 200), or the housing 90 may be inverted (e.g., rotated 180 degrees) and then coupled in a top position 205 (FIG. 2). In the top position 205, the joint 115 for the float arm 95 will be on the opposing side of the bracket 135. The passage 195 and male key 110 arrangement provides additional adjustability in the assembly (LSA) 55 as inverting the housing 90 shifts or translates the housing 90 (and therefore the float arm 95, etc.); e.g., up or down. Other coupling arrangements are possible; e.g., using other keyed arrangements, fasteners, etc., and the mount 50 and housing 90 may be formed in the same piece of material.

One or more flanges 140 of the mount couple the interconnect member 130 and the bracket 135 to one another. The flange(s) 140 may space the bracket 135 from the interconnect member 130 to permit ends 150, 155 of the interconnect member 130 to be pressed within the interiors 170 of the tubes. Furthermore, the flange(s) 140 may angularly position the bracket 135 relative thereto. In addition, the bracket 135 may be offset or spaced from the center of the interconnect member 130 via the flange(s) 140 (FIG. 4). And other arrangements and embodiments are possible.

Figure 8:
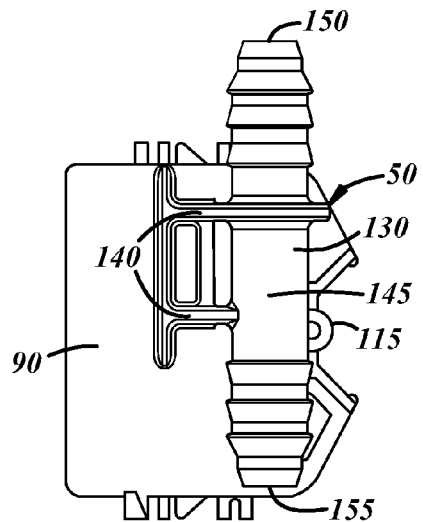
FIG. 8 is a front view of a mount and LSA housing.
Figure 9:
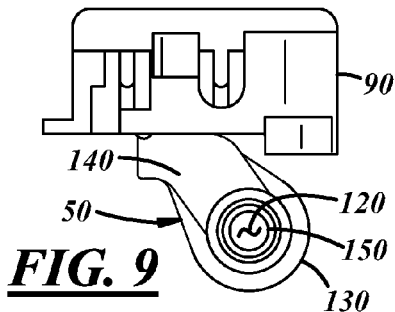
FIG. 9 is a top view of the mount and LSA housing of FIG. 8.

FIGS. 8 and 9 illustrate another implementation for mounting the LSA 55. Here, the mount 50 may include the interconnect member 130 and one or more flanges 140 and not include bracket 135. For example, the flange(s) 140 may directly couple the interconnect member 130 to the housing 90 of the LSA 55. And the mount and the housing may be formed in the same piece of material.

Figure 11:
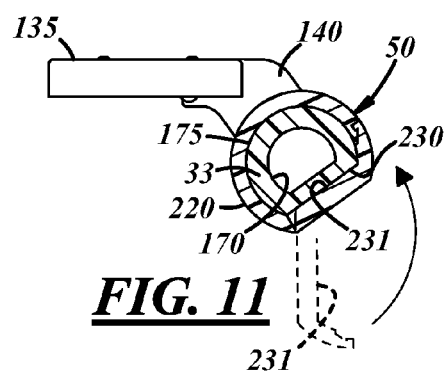
FIG. 11 is a top view of the mount as shown in FIG. 10.
Figure 10:
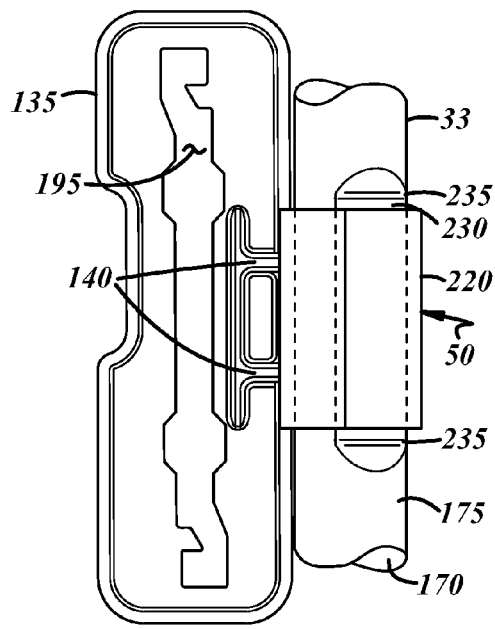
FIG. 10 is a rear view of a mount coupled to a tube.

In yet another implementation of the mount 50, the LSA housing 90 may be directly or indirectly (via the bracket 135) coupled to the exterior 175 of a single tube 33 via the one or more flanges 140, the tube 33 extending between the pump and the filter. For example, as shown in FIGS. 10 and 11, the exterior coupling may be a clip-on member 220 which may include a fastener, a clamp, or similar device. To inhibit or prevent rotation of the housing 90, the clip-on member 220 may be non-circular or include some anti-rotation stop member 231 or surface. In addition, the tube 33 may have a complementary flat portion 230. This mount may be prevented from sliding on or along the tube due to one or more anti-slide stop members 235, which may be integral shoulders or separate components, on the tube.

In the past, the shape and size of fuel tanks has varied greatly. And the mounts for their level sensor housings were fixed in position; e.g., the level sensor housing may have been located in a fixed position on the pump module or its housing. Additionally, the level sensor mounts had to be separately located or designed for each tank shape and size. The present implementations of the fuel sensor mount 50 eliminate the design need for multiple housings, flanges, and brackets to accommodate the various shapes and sizes of fuel tanks.

For example, the mount 50 is versatile during installation, having two degrees of freedom (rotation and translation). The interconnect member 130 may be rotatably oriented to any desirable position (0-360 degrees) and thereafter secured in the position by retention feature(s) (e.g., the barbs 165 and/or the partial barbs 185). The interconnect member 130 also may be vertically located anywhere along the tube(s). For example, where the implementation includes the upper and lower tubes 40, 45, the lengths of the tubes may be adjusted to position the mount 50 and the LSA 55 closer to or farther from the pump 20 and/or the filter 60.

Another versatile aspect of the present implementations include the reach of the float arm 95 between the top 210 and bottom 215 of the fuel tank. Since the housing 90 may be coupled to the bracket 135 in multiple orientations, the reach of the float arm may be optimized in a plurality of differently shaped or sized tanks.

Another possible benefit in at least some implementations of the mount 50 is the elimination of additional components, creating a simpler and more robust design. Engineering development and testing costs may be decreased as well as manufacturing tooling and logistics costs.

Yet another benefit in at least some implementations is that the mount 50 is relatively small. Therefore, manufacturing of the mount requires a minimal amount of material, and the component weighs comparably less than previous implementations.

Yet another benefit of the mount 50 is its positional retention after installation. Originally, the LSA's position may be calibrated (when installed) in order to enhance the level sensor's accuracy, particularly when the float 100 is at or near the bottom 215 of the tank 15. The calibration may be important in order for the fuel sensor accurately to detect when the fuel tank is empty (or approaching empty). Vehicle users appreciate knowing when their tanks are near empty. It naturally follows that retention of that calibrated position is also important so that users will continue to know when the tank is approaching empty throughout the life of their fuel tank assembly. The retention feature(s) of the mount 50 contribute to this positional retention.

According to one method of installation, the mount 50 of the fuel pump assembly 20 may be installed by determining the desired angular orientation of the LSA 55 within the fuel tank 15; i.e., the direction the LSA housing 90 faces in the tank 15 relative to the fuel pump housing 30. Once the orientation is determined, the desired spatial location of the tube coupling region 70 may be determined. For example, this may include determining the distance the LSA 55 should be from the top 210 or bottom 215 of the tank 15. Once the desired orientation and spatial location of the LSA 55 are determined, the first end 150 of the interconnect mount 130 may be coupled (e.g., inserted or secured) within the interior 170 of the upper inlet tube 40 at the end 180 such that the LSA housing 90 has (or will have when coupled to the bracket 135) the determined angular orientation. The second end 155 of the interconnect member 130 may be coupled (e.g., inserted or secured) within the interior 170 of the lower inlet tube 45 at the end 190. The angular orientation of the filter 60 may be taken into account prior to coupling the interconnect member 130 and the lower inlet tube 45 to ensure that the filter 60 properly is properly oriented near the bottom 215 of the tank 15. Fuel may then be taken in by the pump 25 through the filter 60, the lower inlet tube 45, the passage 120 in the interconnect member 130, and the upper inlet tube 40. The fuel is then pressurized and delivered to the engine to support engine operation.

While the forms of the disclosure herein disclosed constitute presently preferred embodiments, many others are possible. It is not intended herein to mention all the possible equivalent forms or ramifications of the disclosure. It is understood that the terms used herein are merely descriptive, rather than limiting, and that various changes may be made without departing from the spirit or scope of the disclosure.

The invention claimed is:

1. A mount for a fuel level sensor assembly in a fuel tank having a fuel pump, the fuel pump configured to draw fuel through first and second tubes in the fuel tank, the mount comprising:
   an interconnect member having a through passage configured to couple one end of the first tube to one end of the second tube to permit fuel flow through the first tube, the through passage of the interconnect member and the second tube, wherein another end of the first tube is configured to be in fluid communication with the fuel pump and another end of the second tube is configured to be in fluid communication with fuel in the fuel tank;
   a bracket carried by the interconnect member and configured to carry at least a portion of the fuel level sensor assembly; and
   at least one of the first and second tubes disposing the fuel level sensor assembly in a predetermined position relative to a top or bottom wall of the fuel tank.

2. The mount of claim 1 wherein the at least a portion of the level sensor assembly includes a housing in which a variable resistor assembly is received, and the housing is coupled to the bracket.

3. The mount of claim 2 wherein the housing includes a key and the bracket includes a mating surface to couple the housing to the bracket.

4. The mount of claim 1 wherein the interconnect member has a body portion with a first end for coupling to the first tube, a second end for coupling to the second tube and the through passage is in communication with both the first tube and the second tube to permit fluid flow between the first tube and the second tube by way of the through passage.

5. The mount of claim 4 wherein at least one of the first end or the second end includes retention features to retain thereon its associated one end of the first tube or the second tube.

6. The mount of claim 5 wherein the retention features include outwardly extending barbs configured to engage an inner surface of said associated first tube or second tube.

7. The mount of claim 1 wherein the bracket and interconnect member are integrally formed from the same piece of material.

8. The mount of claim 1 wherein flanges interconnect the bracket and the interconnect member.

9. An apparatus for a fuel tank having a fuel pump, the fuel pump configured to draw fuel through first and second tubes in the fuel tank, the apparatus comprising:
   a mount having an interconnect member with a through passage configured to couple one end of the first tube to one end of the second tube wherein fuel may be communicated through the first tube, second tube and through passage of the interconnect member, wherein another end of the first tube is configured to be in fluid communication with the fuel pump and another end of the second tube is configured to communicate with fuel in the fuel tank; and
   a fuel level sensor assembly is carried by the mount wherein coupling the mount to the tubes positions the fuel level sensor assembly relative to a top or bottom of the fuel tank.

10. The apparatus of claim 9 wherein the fuel level sensor assembly includes a housing in which a variable resistor assembly is received, and the housing is carried by the mount.

11. The apparatus of claim 9 wherein the interconnect member has a body portion with a first end for coupling to the first tube, a second end for coupling to the second tube and the through passage is in communication with both the first tube and the second tube to permit fluid flow between the first tube and the second tube by way of the through passage.

12. The apparatus of claim 11 wherein at least one of the first end or the second end includes retention features to retain thereon its associated one end of the first tube or the second tube.

13. A fuel tank assembly, comprising:
   a fuel pump assembly, comprising:
   a fuel pump for pumping fuel;
   one end of a first tube through which fuel is provided to the fuel pump, the first tube arranged upstream of the fuel pump in the fuel tank assembly;
   a mount coupled to another end of the first tube, the mount arranged upstream of the fuel pump in the fuel tank assembly; and
   a level sensor assembly carried by the mount so that the level sensor assembly is carried by the first tube in a predetermined position relative to a top or bottom wall of the fuel tank.

14. The fuel tank assembly of claim 13 further comprising a second tube in communication with fuel in the fuel tank and wherein the mount comprises an interconnect member having a through passage and configured to couple the first tube to the second tube so that fuel may be communicated through the first tube, the through passage of the interconnect member and the second tube.

15. The fuel tank assembly of claim 14 wherein the interconnect member comprises a body portion having a first end and a second end, wherein the first end is coupled to the interior of the first tube and the second end is coupled to the interior of the second tube.

16. The fuel tank assembly of claim 13 wherein the mount is coupled to the exterior of the first tube.

17. A method of installing a fuel level sensor assembly in a fuel tank, comprising the steps of:
- determining a desired orientation of the fuel level sensor assembly in the fuel tank relative to a top or bottom of the fuel tank;
- coupling a through passage of a mount for the fuel level sensor assembly to one end of a first tube according to the determination, the mount configured to carry at least a portion of the fuel level sensor assembly;
- coupling the through passage of the mount to one end of a second tube whereby fluid flows through the first tube, the through passage of the mount and the second tube to a fuel pump inside the fuel tank; and
- at least one of the tubes disposes the fuel level sensor assembly in the predetermined position relative to the top or bottom of the fuel tank.

18. The method of claim 17 wherein determining the desired orientation of the fuel level sensor assembly includes determining an angular position with respect to the first tube.

19. The method of claim 17 further comprising determining the desired spatial location of the fuel level sensor assembly within the fuel tank, wherein determining the spatial location includes determining the distance of the fuel level sensor assembly from the bottom of the fuel tank.

\* \* \* \* \*